United States Patent
Song

(10) Patent No.: US 9,874,905 B2
(45) Date of Patent: Jan. 23, 2018

(54) DISPLAY SCREEN SYSTEM AND CONTROL METHOD THEREFOR

(71) Applicant: BOE Technology Group Co., Ltd., Beijing (CN)

(72) Inventor: Song Song, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/124,072

(22) PCT Filed: May 29, 2015

(86) PCT No.: PCT/CN2015/080227
§ 371 (c)(1),
(2) Date: Sep. 7, 2016

(87) PCT Pub. No.: WO2016/090864
PCT Pub. Date: Jun. 16, 2016

(65) Prior Publication Data
US 2017/0017271 A1    Jan. 19, 2017

(30) Foreign Application Priority Data
Dec. 12, 2014  (CN) .......................... 2014 1 0768072

(51) Int. Cl.
*G06F 1/16*    (2006.01)
(52) U.S. Cl.
CPC .................. *G06F 1/1652* (2013.01)
(58) Field of Classification Search
CPC .................................................. G06F 1/1652
See application file for complete search history.

(56) References Cited

U.S. PATENT DOCUMENTS 7,395,850 B2 *  7/2008  Chino ...................... E06B 9/54
                                                         160/243
7,667,962 B2 *  2/2010  Mullen ................. G06F 1/1624
                                                         359/461
(Continued)

FOREIGN PATENT DOCUMENTS

CN      101952788 A      1/2011
CN      103069473 U      4/2013
(Continued)

OTHER PUBLICATIONS

First Office Action, including Search Report, for Chinese Patent Application No. 201410768072.0, dated Mar. 31, 2017, 7 pages.
(Continued)

*Primary Examiner* — Adrian S Wilson
(74) *Attorney, Agent, or Firm* — Westman, Champlin & Koehler, P.A.

(57) ABSTRACT

A display screen system is disclosed. The display screen system includes: a flexible display part; a winding and receiving part for winding and receiving the display part from a first end of the display part; and a control module for controlling the display part and the winding and receiving part. The control module includes a current detection circuit, which comprises a front-side electrode provided on a front side of the display part and a back-side electrode provided on a back side of the display part, and the front-side electrode and the back-side electrode are configured such that the front-side electrode is brought into contact with the back-side electrode to bring the current detection circuit into a switch-on state when the display part is wound. A control method for a display screen system is further disclosed.

20 Claims, 4 Drawing Sheets

(56) References Cited

U.S. PATENT DOCUMENTS

| | | | |
|---|---|---|---|
| 8,009,422 B2* | 8/2011 | Misawa | G02F 1/133305 345/156 |
| 8,508,920 B2 | 8/2013 | Huitema et al. | |
| 8,516,728 B2* | 8/2013 | Jung | G09F 9/301 160/133 |
| 8,654,519 B2* | 2/2014 | Visser | G09F 9/00 361/679.21 |
| 8,665,236 B2 | 3/2014 | Myers | |
| 8,896,563 B2 | 11/2014 | Myers | |
| 8,953,327 B1* | 2/2015 | Salmon | G06F 1/1652 160/242 |
| 9,063,592 B2* | 6/2015 | Kim | G02F 1/13306 |
| 9,110,580 B2* | 8/2015 | Richardson | G06F 3/0488 |
| 9,146,590 B2 | 9/2015 | Myers | |
| 9,367,095 B2 | 6/2016 | Myers | |
| 2002/0090980 A1* | 7/2002 | Wilcox | G06F 1/1601 455/566 |
| 2004/0183958 A1* | 9/2004 | Akiyama | G02F 1/133305 349/58 |
| 2005/0041012 A1* | 2/2005 | Daniel | G06F 1/1601 345/156 |
| 2009/0302176 A1* | 12/2009 | Kuroi | F16M 11/38 248/176.3 |
| 2010/0164973 A1* | 7/2010 | Huitema | G06F 1/1615 345/581 |
| 2011/0018785 A1* | 1/2011 | Aoki | G06F 1/1601 345/1.3 |
| 2011/0176260 A1* | 7/2011 | Walters | G06F 1/1641 361/679.01 |
| 2013/0300682 A1 | 11/2013 | Choi et al. | |
| 2014/0211399 A1* | 7/2014 | O'Brien | G06F 1/1624 361/679.26 |
| 2014/0247544 A1 | 9/2014 | Ryu | |
| 2014/0320393 A1 | 10/2014 | Modarres et al. | |
| 2015/0029229 A1* | 1/2015 | Voutsas | G06F 1/1652 345/661 |
| 2017/0168638 A1* | 6/2017 | Shi | G06F 3/0416 |

FOREIGN PATENT DOCUMENTS

| | | |
|---|---|---|
| CN | 103389866 A | 11/2013 |
| CN | 103827770 A | 5/2014 |
| CN | 203721163 U | 7/2014 |
| CN | 104122992 A | 10/2014 |
| CN | 104407675 A | 3/2015 |
| CN | 204347693 U | 5/2015 |

OTHER PUBLICATIONS

International Search Report and Written Opinion, including English translation of Box No. V, for International Application No. PCT/CN2015/080227, dated Sep. 16, 2015, 10 pages.

* cited by examiner

DISPLAY SCREEN SYSTEM AND CONTROL METHOD THEREFOR

CROSS-REFERENCE TO RELATED APPLICATION

This application is a Section 371 National Stage Application of International Application No. PCT/CN2015/080227, filed on May 29, 2015, entitled "DISPLAY SCREEN SYSTEM AND CONTROL METHOD THEREFOR", which claims priority to Chinese Application No. 201410768072.0, filed on Dec. 12, 2014, incorporated herein by reference in their entirety.

BACKGROUND OF THE INVENTION

Field of the Invention

Embodiments of the present disclosure relate to a field of display technology, and more particularly, to a display screen system and a control method for a display screen system.

Description of the Related Art

As a liquid crystal display technology develops, peoples begin to increasingly pay attention to a flexible liquid crystal display screen. Particularly, there has presented some electronic products using the flexible liquid crystal display screen, such as a mobile phone, etc., at present.

Different from a conventional display screen having a rigid outer frame, a flexible display screen does not have a rigid outer frame or just has a flexible outer frame. In this way, the flexible display screen may typically achieve some special functions by means of its flexibility.

One problem with such a display screen is in that it is not sufficient for the display screen to resist an external impact since it does not have a rigid outer frame or just has a flexible outer frame, thus the display screen is easily damaged. Therefore, it generally requires a corresponding accommodating structure to accommodate and protect the display screen when it is not in use.

Currently, known electronic products using a flexible display screen typically use two protection modes for protecting the display screen, one mode is to provide a housing for protecting the display screen, and the other mode is to provide a space for extension and retraction of the display screen, into which the display screen may be retracted when it is not used.

However, it is generally difficult for the current flexible display screen to control the location and extent of its retraction when retracted, and no other related operations or functions can be automatically performed during or after its retraction.

SUMMARY OF THE INVENTION

In order to overcome the above drawbacks in the prior art, embodiments of the present discloses provide a display screen system and a control method for such a display screen system.

According to a first aspect of the present disclosure, there is provided a display screen system, comprising: a flexible display part; a winding and receiving part for winding and receiving the display part from a first end of the display part; and a control module for controlling the display part and the winding and receiving part. The control module comprises a current detection circuit, which comprises a front-side electrode provided on a front side of the display part and a back-side electrode provided on a back side of the display part, and the front-side electrode and the back-side electrode are configured such that the front-side electrode is brought into contact with the back-side electrode to bring the current detection circuit into a switch-on state when the display part is wound.

According to an embodiment of the present disclosure, the winding and receiving part comprises: a housing comprising an opening for enabling the display part to be wound into the winding and receiving part and extended out of the winding and receiving part; and a support structure disposed in a center of an interior of the housing and connected to the first end of the display part.

According to an embodiment of the present disclosure, the winding and receiving part further comprises a flexible liner provided on an inner side of the housing, and the wound display part is held between the flexible liner and the support structure when the display part is wound into the winding and receiving part.

According to an embodiment of the present disclosure, the support structure comprises: an outer circumferential support wall; a central rotating shaft configured to rotate the support structure; and a plurality of telescopic struts arranged to connect the outer circumferential support wall with the central rotating shaft in a stretchable manner, wherein the plurality of telescopic struts are arranged outside of the central rotating shaft in a circumferential direction at an equal angular interval and configured to extend and retract in a radial direction, and wherein the outer circumferential support wall has an elasticity so that an outer diameter of the outer circumferential support wall is changed as the struts extend and retract.

According to an embodiment of the present disclosure, the control module comprises: a detector for detecting a current in the current detection circuit; a processor for determining a winding state of the display part depending on the current detected by the detector; and a controller for controlling the display screen system depending on the winding state of the display part determined by the processor.

According to an embodiment of the present disclosure, the detector, the processor and the controller are integrated into a circuit in an interior of the display part.

According to an embodiment of the present disclosure, the detector, the processor and the controller are disposed in the winding and receiving part.

According to an embodiment of the present disclosure, the front-side electrode and the back-side electrode are disposed at side frames of the front side and the back side of the display part, respectively.

According to an embodiment of the present disclosure, the front-side electrode and the back-side electrode each is a flexible strip-shaped sheet-like electrode, the front-side electrode comprises a first portion arranged adjacent to the first end of the display part and a second portion arranged away from the first end of the display part, and the front-side electrode is brought into contact with and overlapped with the back-side electrode to an extent that depends on an extent to which the display part in the winding and receiving part is wound.

According to an embodiment of the present disclosure, the back-side electrode is rectangular as a whole.

According to an embodiment of the present disclosure, the first portion of the front-side electrode has a rectangular shape and the second portion of the front-side electrode has a triangular shape.

According to an embodiment of the present disclosure, the second portion of the front-side electrode has a resistance significantly larger than a resistance of the first portion of the front-side electrode.

According to an embodiment of the present disclosure, the current detection circuit comprises two front-side electrodes in parallel connection with each other and two back-side electrodes in parallel connection with each other; and the two front-side electrodes are disposed at two side frames of the front side of the display part, respectively, and the two back-side electrodes are disposed at two side frames of the back side of the display part, respectively.

According to another aspect of the present disclosure, there is provided a control method for a display screen system, comprising steps of: detecting a current in the current detection circuit; determining a winding state of the display part depending on the detected current; and controlling the display part and/or the winding and receiving part depending on the determined winding state of the display part.

According to an embodiment of the present disclosure, the step of determining the winding state of the display part depending on the detected current comprises steps of: if the detected current is equal to zero, then it is determined that the display part is in an unwound state; and if the detected current is not equal to zero, then it is determined that the display part is in an on-winding or already-wound state.

According to an embodiment of the present disclosure, the step of determining the winding state of the display part depending on the detected current comprises steps of: if the detected current is continuously and regularly changed, then it is determined that the display part is in a normal on-winding or on-extending state; and if the detected current is suddenly and irregularly or abnormally changed, then it is determined that the display part is in an over-wound or over-extended state, wherein the control method further comprises a step of: stopping winding the display part if it is determined that the display part is in an over-wound or over-extended state.

According to an embodiment of the present disclosure, the current detection circuit comprises a first front-side electrode and a second front-side electrode in parallel connection with the first front-side electrode, and a first back-side electrode and a second back-side electrode in parallel connection with the first back-side electrode, and the two front-side electrodes are disposed at two side frames of the front side of the display part, respectively, and the two back-side electrodes are disposed at two side frames of the back side of the display part, respectively, and the first front-side electrode and the first back-side electrode form a first loop of the current detection circuit and the second front-side electrode, and the second back-side electrode form a second loop of the current detection circuit, wherein the control method further comprises steps of: detecting a first current in the first loop; detecting a second current in the second loop; comparing the first current with the second current; and determining whether the display part is in a deflection state or not depending on a comparison result between the first current and the second current.

According to an embodiment of the present disclosure, the step of determining whether the display part is in a deflection state or not depending on the comparison result between the first current and the second current comprises steps of: if a difference between the first current and the second current is less than a first predetermined value, then it is determined that the display part is in a non-deflection state, and if the difference between the first current and the second current is greater than or equal to the first predetermined value, then it is determined that the display part is in a deflection state, wherein the control method further comprises a step of: stopping winding the display part and performing a deflection correction operation to the display part when it is determined that the display part is in a deflection state.

According to an embodiment of the present disclosure, the step of determining the winding state of the display part depending on the detected current comprises a step of: determining that the display part is in a half-wound state if the detected current is equal to a second predetermined value, and wherein the control method further comprises a step of: changing a display mode of the display part if it is determined that the display part is in a half-wound state.

According to an embodiment of the present disclosure, the winding and receiving part comprises a housing and a support structure provided in the housing for supporting the wound display part, the support structure comprises a plurality of telescopic struts configured to change an outer diameter of the support structure, wherein the control method further comprises a step of: controlling the plurality of telescopic struts to increase the outer diameter of the support structure so as to sandwich the display part between the housing and the support structure when it is required to stop winding the display part.

By means of the display screen system and the control method therefor provided in the embodiments of the present disclosure, it conveniently realizes winding and accommodating the flexible display screen, and corresponding controls may be performed according to a procedure of the winding and accommodating of the flexible display screen, thus, the flexible display screen may be better protected and various controls to the flexible display screen may be provided.

BRIEF DESCRIPTION OF THE DRAWINGS

In order to clearly describe technical solutions of embodiments of the present disclosure, the preferred embodiments of the present disclosure will be described by a way of example in conjunction with the accompanying drawings, in which.

DETAILED DESCRIPTION OF PREFERRED EMBODIMENTS OF THE INVENTION

In the following description, for purposes of explanation and not limitation, specific details such as specific structures are proposed to thoroughly understand the present disclosure for those skilled in the art. However, it should be appreciated for those skilled in the art that the present disclosure can be implemented in other embodiments without such specific details. In other cases, the detailed description to the well-known devices, circuits, and methods are omitted so as to avoid obscuring the key point of the present disclosure due to the unnecessary details.

Next, the embodiments of the present disclosure will be described in detail with reference to the accompanying figures.

Figure 1:
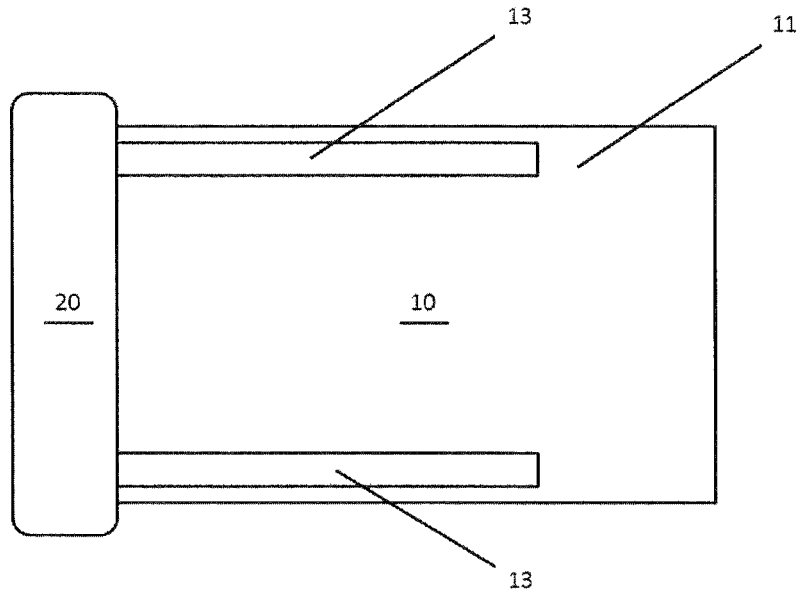
FIG. 1 is a schematic front view of a display screen system according to an embodiment of the present disclosure.
Figure 2:
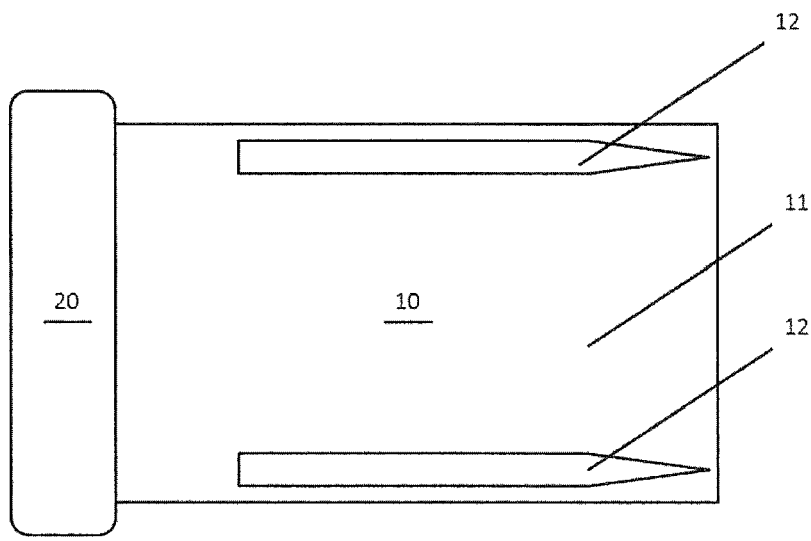
FIG. 2 is a schematic rear view of the display screen system according to the embodiment of the present disclosure.

FIGS. 1 and 2 are schematic front and rear views of a display screen system according to an embodiment of the present disclosure, respectively. As shown in the figures, the display screen system according to the present embodiment comprises a display part 10, a winding and receiving part 20 and a control module. The display part 10 comprises a display screen, and more specifically, a flexible display screen based on OLED. The display screen comprises a flexible display screen body 11.

The control module comprises at least one front-side electrode 12 (two front-side electrodes shown in the figures) provided on a front side of the flexible display screen body 11 and at least one back-side electrode 13 (two back-side electrodes shown in the figures) provided on a back side of the flexible display screen body 11. In addition, the control module further comprises a power module, a current detection module and a processing module (not shown in the figures), which will be described in detail below.

In an exemplary embodiment, portions of the control module excluding the front-side electrode 12 and the back-side electrode 13 may be integrated into the display part 10, for example, integrated in an interior of the display screen body 11. For example, the front-side electrode 12 and the back-side electrode 13 may be provided on the front side and the back side of the display screen body 11 by adhering, etc., respectively, and connected to other components or modules of the control module by wires passing through the display screen body 11. A circuit of the control module may also be integrated into a circuit in the interior of the display screen body.

In another exemplary embodiment, portions of the control module excluding the front-side electrode 12 and the back-side electrode 13 may also be disposed in the winding and receiving part 20. For example, the front-side electrode 12 and the back-side electrode 13 may be provided on the front side and the back side of the display screen body 11 by adhering, etc., respectively, and connected to other components or modules of the control module by wires extending into the winding and receiving part 20.

In order to ensure that the provision of the front-side electrode 12 and the back-side electrode 13 would not adversely affect the normal operation of the display part 10, for example, shielding formation displayed in the display part 10, the front-side electrode 12 and the back-side electrode 13 are preferably arranged on frames of the display screen body 11.

The display part 10 comprises a winding end connected to the winding and receiving part and an extending end arranged opposite to the winding end. The display part 10 may be wound into the winding and receiving part 20 from the winding end, so that the occupied area of the display part 10 is significantly reduced when it is wound up. Since the display part 10 needs to be wound, the front-side electrode 12 and the back-side electrode 13 provided on the display part 10 should have a certain flexibility, for example, they are made of flexible materials.

Figure 3:
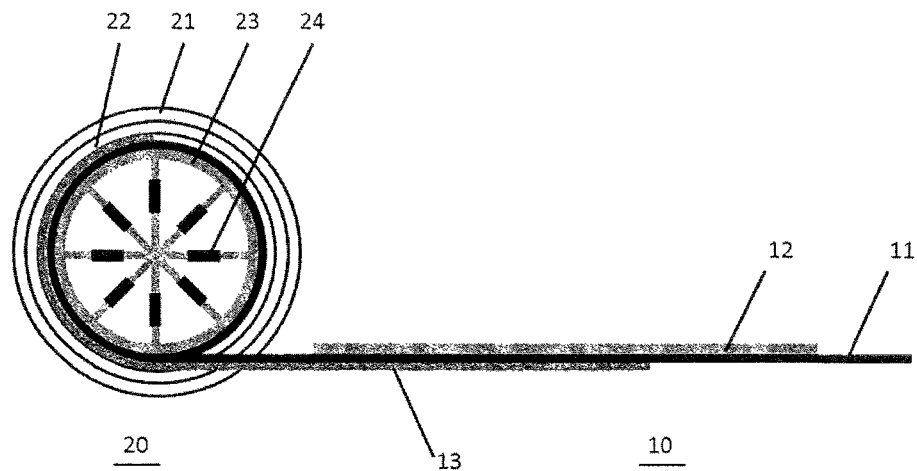
FIG. 3 is a schematic cross sectional view of the display screen system according to the embodiment of the present disclosure, in a side view.

As shown in the figures, each of the front-side electrodes 12, and a corresponding back-side electrode 13 are preferably arranged on positions of the flexible display screen body at the same height, so that the front-side electrodes 12 on the front side of the flexible display screen body 11 may be brought into contact with the respective back-side electrodes 13 when the display part 10 is wound (as shown in FIG. 3). Specifically, in a case that the front-side electrodes 12 and the back-side electrodes 13 each is arranged on the frame of the display screen body 11, the front-side electrode 12 will be brought into contact with the corresponding back-side electrode 13 when the display part 10 is being wound. The term "contact" here means that the front-side electrode is electrically connected to the back-side electrode.

In the display screen system according to the embodiment of the present disclosure, the front-side electrodes 12 and the back-side electrodes 13 each has a predetermined shape. For example, FIGS. 1 and 2 show an electrode configuration, in which the front-side electrode 12 is a strip-shaped sheet-like electrode having a certain width as a whole, so as to be attached or adhered to the display screen body and be brought into contact with the back-side electrode 13 during winding. As shown in FIG. 2, the front-side electrode 12 comprises two portions: a first rectangular portion and a second triangular portion. The back-side electrode 13 is also a strip-shaped sheet-like electrode having a certain width as a whole, so as to be attached or adhered to the display screen body, and be brought into contact with the front-side electrode 12 during winding. The back-side electrode 13 has a rectangular shape as a whole. When the front-side electrodes 12 and the back-side electrodes 13 are arranged on the frames of the display screen body 11, the width of the front-side electrodes 12 and the back-side electrodes 13 may be determined, for example depending on the width of the frame of the display screen body 11.

In other embodiments which are not shown, the second triangular portion of the front-side electrode 12 may be set into other shapes, as will be described in detail below.

In an embodiment which is not shown, the shapes of the front-side electrode 12 and the back-side electrode 13 may be interchanged with each other, that is, the front-side electrode 12 has a rectangular shape as a whole, and the back-side electrode 13 comprises two portions: a first elongated rectangular portion and a second triangular portion.

Figure 5:
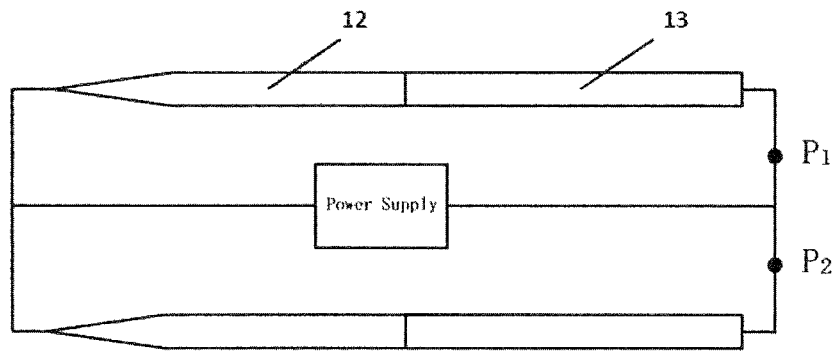

As shown in FIG. 3, when the display part 10 of the display screen system is wound, the front-side electrode 12 and the back-side electrode 13 will be brought into contact with each other, and the first rectangular portion of the front-side electrode 12 will firstly be brought into contact with the back-side electrode 13 (as shown in FIG. 5). It may be achieved by arranging the first rectangular portion of the front-side electrode 12 closer to the winding end of the display part 10 than the second triangular portion.

FIG. 3 is a schematic cross sectional view of the display screen system according to the embodiment of the present disclosure, in a side view. The display screen system comprises a display part 10 and a winding and receiving part 20, the display part 10 may be wound and accommodated in the winding and receiving part 20, and extended by reversely winding so as to extend out from the winding and receiving part 20.

The winding and receiving part 20 comprises: a housing 21 which is for example cylindrical and includes an opening (not shown) through which the display part 10 may enter into the housing 21 and extend out of the housing 21; a flexible liner 22 provided on an inner side of the housing 21; and a support structure 23 disposed in a central region of the winding and receiving part. As shown in FIG. 3, the display part 10 is wound and accommodated between the flexible liner 22 and the support structure 23. The flexible liner 22 is used to prevent the display part 10 from being damaged due to a contact friction between the display part 10 and the rigid housing 21.

The support structure 23 comprises: an outer circumferential support wall; a central rotating shaft; and a plurality of telescopic struts 24 (for example, eight telescopic struts as shown in figures) for connecting the outer circumferential support wall with the central rotating shaft. The plurality of telescopic struts 24 extend in a radial direction of the cylindrical housing 21 and are spaced apart from each other at an equal angular interval. In the embodiment of the present disclosure, the telescopic struts 24 may be embodied by any suitable structures which can be controlled to provide an extending and contracting function, for example, a sliding sleeve having a driving mechanism, etc. The outer circumferential support wall has a certain flexibility and elasticity, so that a diameter of the outer circumferential support wall is accordingly changed as the telescopic struts 24 extend and retract. The display screen body 11 may be connected to the outer circumferential support wall, so that the display screen body 11 is driven by the outer circumferential support wall to be gradually wound onto the support structure 23 or gradually unwound from the support structure 23 as the support structure 23 is rotated by rotating the central rotating shaft.

The working principle of the telescopic struts 24 is as follows: when the central rotating shaft is driven to be rotated by for example a motor (not shown), the telescopic struts 24 is placed in a contracted state, so as to ensure that the display screen may be smoothly wound into the housing 21 or extended out from the housing 21; when the rotation of the central rotating shaft stops, the telescopic struts 24 is placed in an extended state, at this time, the display screen in the housing is sandwiched and pressed between the flexible liner 22 and the outer circumferential support wall, so that the front-side electrode 12 and the back-side electrode 13 of the display screen may be in close contact with each other. In other word, after the telescopic struts 24 extend, at least one portion of the wound front-side electrode 12 and at least one portion of the back-side electrode 13 may be pressed and attached to be in close contact with each other, and the display part 10 may be fixed by means of the extension of the telescopic struts 24. In addition, the extension of the telescopic struts 24 may increase a winding radius of the display part 10. The driving manner of the telescopic struts 24 includes, but is not limited to, an electric, hydraulic, pneumatic, electromagnetic manner, etc.

Figure 7:
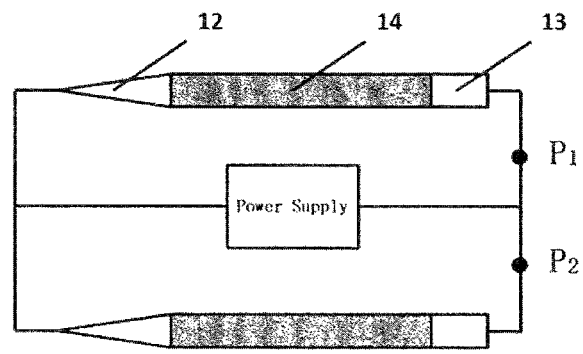
Figure 8:
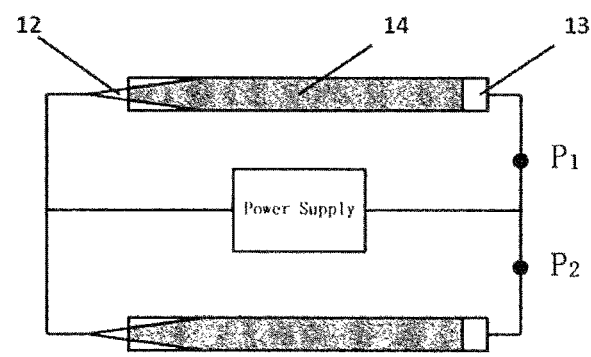
Figure 9:
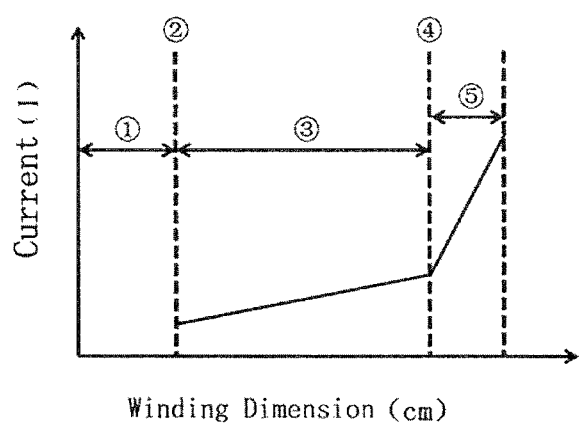
FIG. 9 is a schematic chart showing a relationship between the detected currents corresponding to the states of the current detection circuit shown in FIGS. 4 to 8 and winding dimensions (winding extents).

FIGS. 4-8 show an operation principle of the display screen system according to the embodiment of the present disclosure, and schematically show respective position relationships between front-side electrodes 12 and back-side electrodes 13 in different winding states. FIG. 9 is a schematic chart showing a relationship between currents detected in the control module of the display screen system corresponding to FIGS. 4-8 and winding dimensions or winding extents.

As shown in FIGS. 4-8, the control module comprises a current detection circuit including the front-side electrodes 12 and the back-side electrodes 13.

Figure 4:
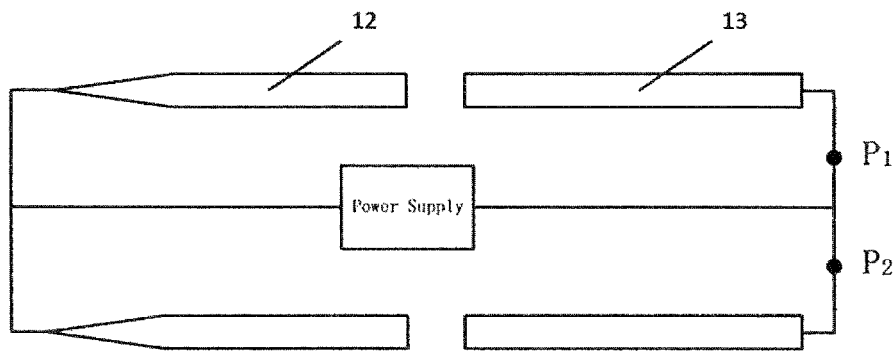
FIGS. 4 to 8 show schematic principle diagrams for current detection of the display screen system according to the embodiment of the present disclosure, show respective position relationships between front-side electrodes and back-side electrodes in a current detection circuit in different winding states.

Since the front-side electrodes 12 and the back-side electrodes 13 are located on the front side and the back side of the display screen body 11, respectively, the front-side electrodes 12 and the back-side electrodes 13 are not in contact with each other when the display screen is not wound, as schematically shown in FIG. 4.

When the display screen body 11 begins to be wound, the display screen body 11 is gradually wound onto the support structure 23. It can be seen from FIG. 3 that, when the back-side electrodes 13 are wound one turn, they may be in contact with the respective front-side electrodes 12, especially the first rectangular portions of the respective front-side electrodes 12, as schematically shown in FIG. 5.

Figure 6:
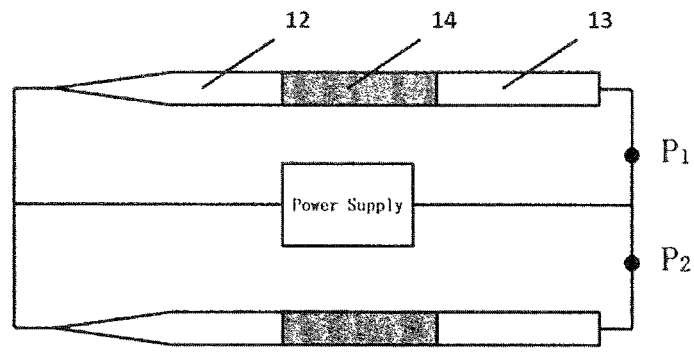

When the display screen body 11 is further wound, it can be seen from FIG. 3 that, the back-side electrodes 13 will be further wound to be attached to the respective front-side electrodes 12, so that there are overlapping portions 14 therebetween, as schematically shown in FIG. 6.

As the display screen body 11 is further wound, the display screen body 11 is wound such that the wound back-side electrodes 13 will be completely attached to the first rectangular portions of the respective front-side electrodes 12. FIG. 7 schematically shows a state where the back-side electrodes 13 are completely attached to the first rectangular portions of the respective front-side electrodes 12.

If the display screen body 11 is further wound in the state shown in FIG. 7, then the back-side electrodes 13 will be further attached to the second triangular portions of the respective front-side electrodes 12. FIG. 8 schematically shows a state where the back-side electrodes 13 are not only attached to the first rectangular portions of the respective front-side electrodes 12, but also the second triangular portions of the respective front-side electrodes 12.

In the embodiment of the present disclosure, both the front-side electrodes 12 and the back-side electrodes 13 are made of materials having a high resistance, so that the current in the control module falls within a predetermined current detection range when the control module is in a switch-on state. As the winding continues, the contact (attachment) degree between the front-side electrode 12 and the back-side electrode 13 is continuously increasing, the integral resistance formed by the front-side electrode 12 and the back-side electrode 13 is accordingly continuously changed, and therefore the current intensity in the circuits schematically shown in FIGS. 4-8 is continuously changed. For example, the contact degree between the front-side electrode 12 and the back-side electrode 13 is gradually increasing, the resistance of the entire component formed by the front-side electrode 12 and the back-side electrode 13 is gradually reducing, thus the resulting current is gradually increasing. Particularly, the first portion and the second portion of the front-side electrode 12 may be made from different materials, and the resistance of the second triangular portion is significantly greater than the first rectangular portion. In this way, when the front-side electrode 12 and the back-side electrode 13 are attached to each other by winding the display screen, the entire change of the resistance will be more significant, as will be described below.

Five basic states shown in FIGS. 4-8 correspond to periods or times ① to ⑤ to shown in FIG. 9, respectively.

The state shown in FIG. 4 corresponds to a period ① shown in FIG. 9. In FIG. 4, the front-side electrode 12 is not in contact with the back-side electrode 13, which corresponds to a state in which for example the display part 10 is not wound. In such a state, the current detection circuit shown in FIG. 4 is in a switch-off state, at this time, there are no currents passing through at points $P_1$ and $P_2$ in the circuit, that is, the current $I_1$ at point $P_1$ and the current $I_2$ at point $P_2$ are equal to zero. This state corresponds to a state in which the display part 10 is not wound, or is being wound with a relatively low degree of winding.

The state shown in FIG. 5 corresponds to a time ② shown in FIG. 9. In FIG. 5, the front-side electrode 12 just begins to be brought in contact with the back-side electrode 13, which corresponds to a state in which for example the display part 10 just begins to be wound. In such a state, the current detection circuit shown in FIG. 5 is in a switch-on state, which was switched on just right now, at this time, there are currents passing through at points $P_1$ and $P_2$ in the current detection circuit, that is, the current $I_1$ at point $P_1$ and the current $I_2$ at point $P_2$ are not equal to zero. At this time, since the front-side electrode 12 and the back-side electrode 13 have a maximum resistance as a whole, the detected current is relatively small.

Based on the above principle, if it is detected that there is a current passing through at $P_1$ or $P_2$ ($I_1$ or $I_2$ is not equal to zero), then it is determined that the display part 10 is being wound or has been wound. If it is detected that there are no currents passing through at $P_1$ and $P_2$ ($I_1$ and $I_2$ are not equal to zero), then it is determined that the display part 10 is not wound (i.e., in a fully extended state), or being wound with a relatively low degree of winding, so that the front-side electrode 12 has not been in contact with the back-side electrode 13.

The state shown in FIG. 6 corresponds to a period ③ shown in FIG. 9. In FIG. 6, the front-side electrode 12 has been in contact with the back-side electrode 13 by a portion thereof, wherein the overlapping portion 14 is represented by a shaded area in the figure. FIG. 6 corresponds to a state in which the display part 10 is being wound (for example, half-wound). At this time, since the area of the overlapping portion 14 between the front-side electrode 12 and the back-side electrode 13 is continuously increasing, the overall resistance of the front-side electrode 12 and the back-side electrode 13 is gradually and regularly reduced relative to the state in which the front-side electrode 12 just begins to be brought in contact with the back-side electrode 13. Therefore, the current $I_1$ at point $P_1$ and the current $I_2$ at point $P_2$ are gradually and regularly increased relative to the state in which the front-side electrode 12 just begins to be brought in contact with the back-side electrode 13. The winding velocity of the display part 10 may be controlled (for example, as a uniform winding) so that the current $I_1$ at point $P_1$ and the current $I_2$ at point $P_2$ are uniformly increased. As shown in period ③ in FIG. 9, the current is uniformly increased.

The state shown in FIG. 7 corresponds to a time ④ shown in FIG. 9. In FIG. 7, the first rectangular portion of the front-side electrode 12 is completely in contact with the back-side electrode 13. At this time, the display part 10 has reached to an ideal state in which a complete winding is achieved.

The state shown in FIG. 8 corresponds to a period ⑤ shown in FIG. 9. During this period, the left-side second triangular portion of the front-side electrode 12 is brought increasingly into contact with and overlapped with the back-side electrode 13. Due to the special shape of the second triangular portion of the front-side electrode 12, for example, an elongated triangular shape as shown in the figure, the overall resistance of the front-side electrode 12 and the back-side electrode 13 as a whole changes differently from the previous change course (for example, the regular linear change or other regular change from the state ② to state ③), thereby the current in the current detection circuit accordingly inconsistently changes. For example, the detected current in the period ⑤ sharply increases, as shown in FIG. 9. Specifically, for example, if the first portion and the second portion of the front-side electrode 12 are made from different materials and the second triangular portion has a resistance significantly greater than that of the first rectangular portion, then the attachment of the back-side electrode 13 and the second triangular portion of the front-side electrode 12 will greatly decrease the overall resistance of the front-side electrode 12 and the back-side electrode 13, thus the overall resistance is significantly reduced, so that the detected current in the circuit is significantly increased. In particular, if the first portion and the second portion are made from materials having significantly different resistances, the second portion of the front-side electrode 12 may also have a simply rectangular shape.

For example, the left-side second portion of the front-side electrode 12 may have some special shapes other than the triangle, as long as it is possible for the current in the current detection circuit to inconsistently change as described above. If the detected current in the circuit presents such an inconsistent change, then it may be determined that the display screen body is in an over-wound state at this time, so the central rotating shaft may be stopped so as to interrupt the winding.

In order to achieve the above objective, the control module of the display screen system according to the embodiment of the present disclosure further comprises: a current detection module for detecting currents at point $P_1$ and $P_2$ in the circuit shown in FIGS. 4-8; a processing module (for example, a microprocessor, an electronic control unit (EUC) or the like) for receiving signals, values or the like from the current detection module to implement comparison, analysis and/or determination; and a controller for controlling the display screen system depending on the process result from the processing module.

As described above, the current detection module, the processing module and the controller may be integrated into the circuit in the interior of the display part 10, or disposed in the winding and receiving part 20.

In the above-described embodiment, two front-side electrodes 12 and two back-side electrodes 13 are provided, while such an arrangement is merely an embodiment of the present disclosure. In other embodiments which are not illustrated, it is available to provide only one front-side electrode 12 and only one corresponding back-side electrode 13. Accordingly, the current detection circuits in FIGS. 4-8 may have only the upper portion or the lower portion, thus it is only necessary to detect the current at one point $P_1$ or $P_2$ in the current detection circuit.

However, it is advantageous to provide the embodiment in which two front-side electrodes 12 and two back-side electrodes 13 are provided. As described above, the two front-side electrodes 12 are identical to each other expect the arrangement position thereof, and the two back-side electrodes 13 are identical to each other expect the arrangement position thereof. Therefore, the current $I_1$ detected at point $P_1$ and the current $I_2$ detected at point $P_2$ should be always identical to or substantially identical to each other during the winding. That is, a difference $\Delta_I$ between the current $I_1$ detected at point $P_1$ and the current $I_2$ detected at point $P_2$ should be equal to or approximately equal to zero during the winding. According to an embodiment of the present disclosure, a threshold may be provided, and if the difference $\Delta_I$ between the detected current $I_1$ and the detected current $I_2$ is greater than the threshold, then it means that the resistance in the upper current detection circuit is significantly different from that in the lower current detection circuit, which may be incurred by the deflection of the display screen during winding. The greater the value $\Delta_f$ is, the greater the degree of the deflection of the display screen during winding is. If such a deflection is not controlled, then the display screen itself will be damaged during further winding.

Next, a control method for a display screen system will be further described.

It should be noted that following control steps may be used alone or in combination with each other.

When it is determined that the display part needs to be wound into the winding and receiving part, the processing module controls a corresponding actuation device to bring the telescopic struts into a contraction state, so that the telescopic struts release the press on the display screen body 11, thereby allowing the display screen body 11 to be wound into the winding and receiving part.

The current detection module may detect and continuously monitor the currents at $P_1$ and $P_2$ in the current detection circuit including the at least one front-side electrode and the at least one back-side electrode. If the detected current is equal to zero, then it is determined that the display part is in an extended state; and if the detected current is not equal to zero, then it is determined that the display part 10 is in an on-winding or already-wound state. As described above, during the display part continuously entering the winding and receiving part, the current $I_1$ and/or $I_2$ detected by the current detection module is continuously changed.

As described above, if the currents $I_1$ and $I_2$ are continuously increased, then it is determined that the display part is currently being wound into the winding and receiving part; if the currents $I_1$ and $I_2$ are continuously decreased, then it is determined that the display part is currently being extended from the winding and receiving part.

In addition, in a normal case, the currents $I_1$ and $I_2$ should be equal to each other. If the currents $I_1$ and $I_2$ are always equal to each other, then it is determined by the processing module that the winding course of the display part is normal; if the current $I_1$ is deviated from the current $I_2$, then it is determined by the processing module that the deflection of the display part occurs during the winding of the display part. If the difference $\Delta_f$ between the currents $I_1$ and $I_2$ is greater than a threshold, then it is determined by the processing module that the degree of the deflection of the display part exceed a tolerable range during the winding, at this time, the controller controls the related mechanism to stop winding the display part. The winding of the display part may be typically stopped in two ways: (1) stopping the winding actuation mechanism; and (2) extending the telescopic struts to press the outer circumferential support wall of the support structure against the surface of the display screen body 11, so as to stop the further winding motion of the display part. At this time, a user may correct the attitude and/or position of the display part by a suitable means (either automatically or manually), so as to eliminate the deflection.

In addition, in the case that the currents $I_1$ and $I_2$ are always equal to each other, a predetermined current value may be provided in the system, for example, the predetermined current value corresponds to a state in which the display part is half wound. Therefore, if the currents $I_1$ and $I_2$ are equal to the predetermined current value, then the display part is just in a position where a half of the display part has been wound into the winding and receiving part. When such a state is recognized by the processing module, the controller controls the corresponding mechanism (for example, the telescopic struts) to stop winding the display part. Furthermore, when the winding of the display part is stopped, the controller may control or adjust the display functions of the display part, for example, a picture in a full screen display may be adjusted to be displayed in one half of the display part exposed outside the winding and receiving part, and the other half of the display part having been wound into the winding and receiving part may be no longer used. Thus, it may provide an additional mode of use, and may save electric energy.

In addition, when it is near the end of the winding, it is possible to perform corresponding control steps, for example:

If the current detected by the current detection circuit is continuously and regularly changed, then it is determined by the processing module that the display part is in a normal on-winding state; if the detected current is inconsistently changed, then it is determined by the processing module that the display part is in an over-wound state; if it is determined that the display part is in an over-wound state, then the controller controls the corresponding mechanism to stop winding the display part. After stopping winding the display part, the controller may further shut off the power supply to the whole display part, or switch off the whole electronic product containing the display part winding system.

In accordance with an embodiment of the present disclosure which is not shown, the above-described second triangular portion and first rectangular portion of the front-side electrode 12 may be interchanged with each other, so as to determine whether the display part is over-extended depending on an abrupt change of the current.

Furthermore, in accordance with a further embodiment of the present disclosure which is not shown, for example, the second triangular portions may be provided at two sides of the first rectangular portion of the front-side electrode 12, respectively. Thus, it may be determined not only whether the display part is over-wound, but also whether the display part is over-extended depending on an abrupt change of the current.

It should be noted that, although the back-side electrode and the front-side electrode each is strip-shaped in the illustrated example, the back-side electrode and the front-side electrode may be not strip-shaped, as long as the back-side electrode can be brought into contact with the front-side electrode after the display part is accommodated in the winding and receiving part. After the display part is accommodated in the winding and receiving part, the controller may switch off the display part according to the electrical contact between the back-side electrode and the front-side electrode; vice versa, when the display part is extended from the winding and receiving part so that the back-side electrode is not in contact with the front-side electrode, the controller may activate the display part according to the disconnection between the back-side electrode and the front-side electrode.

At this end, the embodiments of the present disclosure have been described in detail by way of example, however, it will be appreciated for those skilled in the art that further modifications and variations to the present disclosure may be made without departing from the spirit of the present disclosure, and all of these modifications and variations fall within the scope of the present disclosure.

For example, in the embodiment of the present disclosure, one or two groups of front-side electrodes and corresponding back-side electrodes are proposed, however, more than two groups of electrodes may be used. In addition, in the embodiment of the present disclosure, the electrode having a specific shape is used to affect the resistance in the current detection circuit, however, the affection to the resistance in the circuit may be achieved by means of other means, for example, the overlapping area between the two electrodes may be detected, and then the resistance of a variable resistor may be controlled depending on the detected overlapping area. Therefore, the scope of the present disclosure should be in accordance with the appended claims.

What is claimed is:

1. A display screen system, comprising:
   a flexible display part;
   a winding and receiving part for winding and receiving the display part from a first end of the display part; and
   a control module for controlling the display part and the winding and receiving part,
   wherein the control module comprises a current detection circuit, which comprises a front-side electrode provided on a front side of the display part and a back-side electrode provided on a back side of the display part, and the front-side electrode and the back-side electrode are configured such that the front-side electrode is brought into contact with the back-side electrode to bring the current detection circuit into a switch-on state when the display part is wound.

2. The display screen system according to claim 1, wherein the winding and receiving part comprises:
   a housing comprising an opening for enabling the display part to be wound into the winding and receiving part and extended out of the winding and receiving part; and
   a support structure disposed in a center of an interior of the housing and connected to the first end of the display part.

3. The display screen system according to claim 2, wherein the winding and receiving part further comprises a flexible liner provided on an inner side of the housing, and the wound display part is held between the flexible liner and the support structure when the display part is wound into the winding and receiving part.

4. The display screen system according to claim 2, wherein the support structure comprises:
   an outer circumferential support wall;
   a central rotating shaft configured to rotate the support structure; and
   a plurality of telescopic struts arranged to connect the outer circumferential support wall with the central rotating shaft in a stretchable manner,
   wherein the plurality of telescopic struts are arranged outside of the central rotating shaft in a circumferential direction at an equal angular interval and configured to extend and retract in a radial direction, and
   wherein the outer circumferential support wall has an elasticity so that an outer diameter of the outer circumferential support wall is changed as the struts extend and retract.

5. The display screen system according to claim 1, wherein the control module comprises:
   a detector for detecting a current in the current detection circuit;
   a processor for determining a winding state of the display part depending on the current detected by the detector; and
   a controller for controlling the display screen system depending on the winding state of the display part determined by the processor.

6. The display screen system according to claim 5, wherein the detector, the processor and the controller are integrated into a circuit in an interior of the display part.

7. The display screen system according to claim 5, wherein the detector, the processor and the controller are disposed in the winding and receiving part.

8. The display screen system according to claim 1, wherein the front-side electrode and the back-side electrode are disposed at side frames of the front side and the back side of the display part, respectively.

9. The display screen system according to claim 1, wherein the front-side electrode and the back-side electrode each is a flexible strip-shaped sheet-like electrode, the front-side electrode comprises a first portion arranged adjacent to the first end of the display part and a second portion arranged away from the first end of the display part, and the front-side electrode is brought into contact with and overlapped with the back-side electrode to an extent that depends on an extent to which the display part in the winding and receiving part is wound.

10. The display screen system according to claim 9, wherein the back-side electrode is rectangular as a whole.

11. The display screen system according to claim 10, wherein the first portion of the front-side electrode has a rectangular shape and the second portion of the front-side electrode has a triangular shape.

12. The display screen system according to claim 10, wherein the second portion of the front-side electrode has a resistance significantly larger than a resistance of the first portion of the front-side electrode.

13. The display screen system according to claim 1, wherein the current detection circuit comprises two front-side electrodes in parallel connection with each other and two back-side electrodes in parallel connection with each other; and
   the two front-side electrodes are disposed at two side frames of the front side of the display part, respectively, and the two back-side electrodes are disposed at two side frames of the back side of the display part, respectively.

14. A control method for the display screen system according to claim 1, comprising steps of:
   detecting a current in the current detection circuit;
   determining a winding state of the display part depending on the detected current; and
   controlling the display part and/or the winding and receiving part depending on the determined winding state of the display part.

15. The control method according to claim 14, wherein the step of determining the winding state of the display part depending on the detected current comprises steps of:
   if the detected current is equal to zero, then it is determined that the display part is in an unwound state; and
   if the detected current is not equal to zero, then it is determined that the display part is in an on-winding or already-wound state.

16. The control method according to claim 14, wherein the step of determining the winding state of the display part depending on the detected current comprises steps of:
   if the detected current is continuously and regularly changed, then it is determined that the display part is in a normal on-winding or on-extending state; and
   if the detected current is suddenly and irregularly or abnormally changed, then it is determined that the display part is in an over-wound or over-extended state,
   wherein the control method further comprises a step of:
   stopping winding the display part if it is determined that the display part is in an over-wound or over-extended state.

17. The control method according to claim 14, wherein the current detection circuit comprises a first front-side electrode and a second front-side electrode in parallel connection with the first front-side electrode, and a first back-side electrode and a second back-side electrode in parallel connection with the first back-side electrode, and the two front-side electrodes are disposed at two side frames of the front side of the display part, respectively, and the two back-side electrodes are disposed at two side frames of the back side of the display part, respectively, and the first front-side electrode and the first back-side electrode form a first loop of the current detection circuit, and the second front-side electrode and the second back-side electrode form a second loop of the current detection circuit, wherein the control method further comprises steps of:
detecting a first current in the first loop;
detecting a second current in the second loop;
comparing the first current with the second current; and
determining whether the display part is in a deflection state or not depending on a comparison result between the first current and the second current.

18. The control method according to claim 17, wherein the step of determining whether the display part is in a deflection state or not depending on the comparison result between the first current and the second current comprises steps of:
if a difference between the first current and the second current is less than a first predetermined value, then it is determined that the display part is in a non-deflection state, and
if the difference between the first current and the second current is greater than or equal to the first predetermined value, then it is determined that the display part is in a deflection state, wherein the control method further comprises a step of:
stopping winding the display part and performing a deflection correction operation to the display part when it is determined that the display part is in a deflection state.

19. The control method according to claim 14, wherein the step of determining the winding state of the display part depending on the detected current comprises a step of:
determining that the display part is in a half-wound state if the detected current is equal to a second predetermined value, and wherein the control method further comprises a step of:
changing a display mode of the display part if it is determined that the display part is in a half-wound state.

20. The control method according to claim 14, wherein the winding and receiving part comprises a housing and a support structure provided in the housing for supporting the wound display part, the support structure comprises a plurality of telescopic struts configured to change an outer diameter of the support structure, wherein the control method further comprises a step of:
controlling the plurality of telescopic struts to increase the outer diameter of the support structure so as to sandwich the display part between the housing and the support structure when it is required to stop winding the display part.

* * * * *